United States Patent
Takayama et al.

(10) Patent No.: US 11,443,500 B2
(45) Date of Patent: Sep. 13, 2022

(54) IMAGE PROCESSING APPARATUS, IMAGE PROCESSING METHOD, AND PROGRAM FOR DETECTING DEFECT FROM IMAGE

(71) Applicant: CANON KABUSHIKI KAISHA, Tokyo (JP)

(72) Inventors: Kei Takayama, Kawasaki (JP); Masakazu Matsugu, Yokohama (JP); Atsushi Nogami, Kawasaki (JP); Mahoro Anabuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 60 days.

(21) Appl. No.: 16/731,662

(22) Filed: Dec. 31, 2019

(65) Prior Publication Data

US 2020/0134350 A1    Apr. 30, 2020

Related U.S. Application Data

(63) Continuation of application No. PCT/JP2018/024900, filed on Jun. 29, 2018.

(30) Foreign Application Priority Data

Jul. 7, 2017 (JP) .............................. JP2017-133532

(51) Int. Cl.
*G06V 10/22* (2022.01)
*G06T 7/00* (2017.01)
(Continued)

(52) U.S. Cl.
CPC ....... *G06V 10/235* (2022.01); *G01N 21/8851* (2013.01); *G06T 7/001* (2013.01); *G06T 7/13* (2017.01); *G06T 2207/20104* (2013.01)

(58) Field of Classification Search
None
See application file for complete search history.

(56) References Cited

U.S. PATENT DOCUMENTS

| 2018/0156736 A1* | 6/2018 | Kondo | G06T 7/0008 |
| 2018/0308230 A1* | 10/2018 | Karube | G06T 7/0002 |
| 2020/0103353 A1* | 4/2020 | Kuwabara | G09G 5/377 |

FOREIGN PATENT DOCUMENTS

| GB | 2534143 A | 7/2016 |
| JP | 9-119900 A | 5/1997 |

(Continued)

OTHER PUBLICATIONS

Sinha SK, Fieguth PW. Automated detection of cracks in buried concrete pipe images. Automation in construction. Jan. 1, 2006;15(1):58-72. (Year: 2006).*

*Primary Examiner* — Emily C Terrell
*Assistant Examiner* — Nathan J Bloom
(74) *Attorney, Agent, or Firm* — Canon U.S.A., Inc. IP Division

(57) ABSTRACT

An image processing apparatus includes detecting means for detecting a first detected region and a second detected region from an input image, on the basis of a first detection criterion and a second detection criterion, respectively; image setting means for setting, as a target image subjected to correction, an image including the first detected region, and setting, as a reference image that is referred to in the correction, an image including the second detected region; accepting means for accepting, from a user, designation of a region in the target image and a correction instruction for the designated region; correction region setting means for identifying, in the reference image, a region corresponding to the designated region, and for setting a to-be-corrected region on the basis of the identified region and the second detected region; and correcting means for correcting the first detected region in the target image on the basis of the to-be-corrected region set in the reference image.

13 Claims, 18 Drawing Sheets

(51) Int. Cl.
*G01N 21/88* (2006.01)
*G06T 7/13* (2017.01)

(56) References Cited

FOREIGN PATENT DOCUMENTS

| | | |
|---|---|---|
| JP | 10-48152 A | 2/1998 |
| JP | 2000-2523 A | 1/2000 |
| JP | 2007-256132 A | 10/2007 |
| JP | 2015-232746 A | 12/2015 |
| WO | 2016/189764 A1 | 12/2016 |
| WO | 2017/014288 A1 | 1/2017 |
| WO | 2017/110278 A1 | 6/2017 |
| WO | 2017/110279 A | 6/2017 |

\* cited by examiner

FIG. 8

| DATA NUMBER | COORDINATES $(X_{i,j,k}, Y_{i,j,k})$ |
|---|---|
| d34 | $(X_{1,d34,1}, Y_{1,d34,1}), (X_{1,d34,2}, Y_{1,d34,2}), \cdots, (X_{1,d34,p}, Y_{1,d34,p})$ |
| d35 | $(X_{1,d35,1}, Y_{1,d35,1}), (X_{1,d35,2}, Y_{1,d35,2}), \cdots, (X_{1,d35,q}, Y_{1,d35,q})$ |
| d36 | $(X_{1,d36,1}, Y_{1,d36,1}), (X_{1,d36,2}, Y_{1,d36,2}), \cdots, (X_{1,d36,r}, Y_{1,d36,r})$ |
| d32 | $(X_{2,d32,1}, Y_{2,d32,1}), (X_{2,d32,2}, Y_{2,d32,2}), \cdots, (X_{2,d32,s}, Y_{2,d32,s})$ |
| d33 | $(X_{3,d33,1}, Y_{3,d33,1}), (X_{3,d33,2}, Y_{3,d33,2}), \cdots, (X_{3,d33,t}, Y_{3,d33,t})$ |

IMAGE PROCESSING APPARATUS, IMAGE PROCESSING METHOD, AND PROGRAM FOR DETECTING DEFECT FROM IMAGE

CROSS-REFERENCE TO RELATED APPLICATIONS

This application is a Continuation of International Patent Application No. PCT/JP2018/024900, filed Jun. 29, 2018, which claims the benefit of Japanese Patent Application No. 2017-133532, filed Jul. 7, 2017, both of which are hereby incorporated by reference herein in their entirety.

TECHNICAL FIELD

The present invention relates to an image processing apparatus, an image processing method, and a program for detecting a defect from an image.

BACKGROUND ART

Recently, increased efficiency of inspection of infrastructure such as bridges and dams has been desired and expectations particularly for image-based inspection have been rising. In image-based inspection, images are captured at a site, and defects such as cracking and delamination on the wall of a structure are visually searched for and manually traced later on a display screen. Information on the length of each crack and the number of cracks obtained as a result of tracing is important because it is useful to determine whether the structure needs repairing. However, it takes long to perform the manual tracing work, which is considered to be problematic. For this reason, there are rising expectations for automatic detection technology for automatically detecting a defect region from an image of the surface of a structure through image processing. Japanese Patent Laid-Open No. 2000-2523 discloses a technique for extracting cracking step by step by performing, on an image of cracking, binarization processes based on a plurality of different thresholds.

However, on the surface of a structure, there are many factors such as trace of formwork and elongated dark stains falsely detected as cracking and factors such as shadows leading to no detection. For this reason, it is difficult to automatically detect a defect. For example, trace of formwork is observed as long lines that are caused when the concrete is set and that extend in the horizontal/vertical directions. Since the trace of formwork looks very similar to cracking, the trace of formwork is likely to be a cause of false detection. There is a problem that, when such falsely detected factors and falsely undetected factors are detected, a load of correction work is high.

The present invention is made in view of such a problem and an object thereof is to efficiently and appropriately correct a false positive and a false negative in image-based inspection.

SUMMARY OF INVENTION

Accordingly, in the present invention, an image processing apparatus includes detecting means for detecting a first detected region and a second detected region from an input image, on the basis of a first detection criterion and a second detection criterion, respectively; image setting means for setting, as a target image subjected to correction, an image including the first detected region, and setting, as a reference image that is referred to in the correction, an image including the second detected region; accepting means for accepting, from a user, designation of a region in the target image and a correction instruction for the designated region; correction region setting means for identifying, in the reference image, a region corresponding to the designated region, and for setting a to-be-corrected region on the basis of the identified region and the second detected region; and correcting means for correcting the first detected region in the target image on the basis of the to-be-corrected region set in the reference image.

Further features of the present invention will become apparent from the following description of exemplary embodiments with reference to the attached drawings.

BRIEF DESCRIPTION OF DRAWINGS

FIG. 8 is a diagram illustrating an example of a data format of unit regions.

DESCRIPTION OF EMBODIMENTS

Embodiments of the present invention will be described below with reference to the drawings.

Note that it is assumed in the embodiments that a detection target in image-based inspection is cracking on the wall of infrastructure. That is, a captured image to be processed is an image of the wall of the infrastructure in the embodiments. Note that the detection target is not limited to a defect such as cracking or delamination on the wall of infrastructure and may be an outline or path of an object. In addition, the captured image is not limited to the embodiments and may be an image of a moving object as well as an image of the surface of a bridge, dam, tunnel, or road.

First Embodiment

Figure 1:
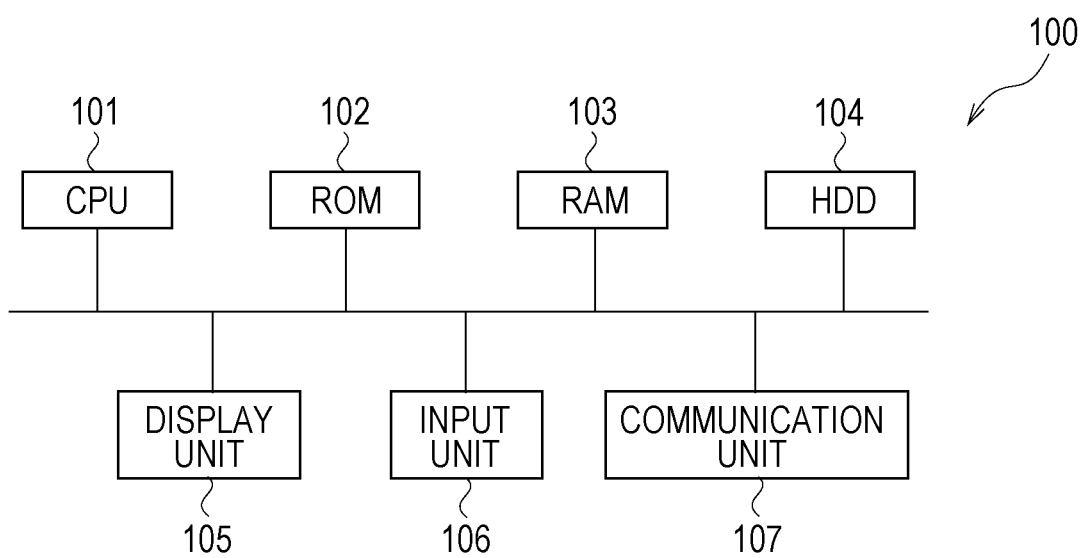
FIG. 1 is a hardware configuration diagram of an image processing apparatus according to a first embodiment.

FIG. 1 is a hardware configuration diagram of an image processing apparatus according to a first embodiment. An image processing apparatus 100 includes a CPU 101, a ROM 102, a RAM 103, an HDD 104, a display unit 105, an input unit 106, and a communication unit 107. The CPU 101 reads a control program stored in the ROM 102 and performs various processes. The RAM 103 is used as a temporary storage area such as a main memory and a work area for the CPU 101. The HDD 104 stores various kinds of data, various programs, and so on. The display unit 105 displays various kinds of information. The input unit 106 includes a keyboard and a mouse and accepts various user operations. The communication unit 107 performs processing for communication with an external apparatus such as an image forming apparatus via a network.

Note that functions and processes of the image processing apparatus 100 described later are implemented as a result of the CPU 101 reading a program stored in the ROM 102 or the HDD 104 and executing this program. Alternatively, the CPU 101 may read a program stored on a storage medium such as an SD card instead of the ROM 102 or the like. Alternatively, at least some of the functions and processes of the image processing apparatus 100 may be implemented by cooperation of pluralities of CPUs, RAMs, ROMs, and storage, for example. Alternatively, at least some of the functions and processes of the image processing apparatus 100 may be implemented using hardware circuitry.

Figure 2:
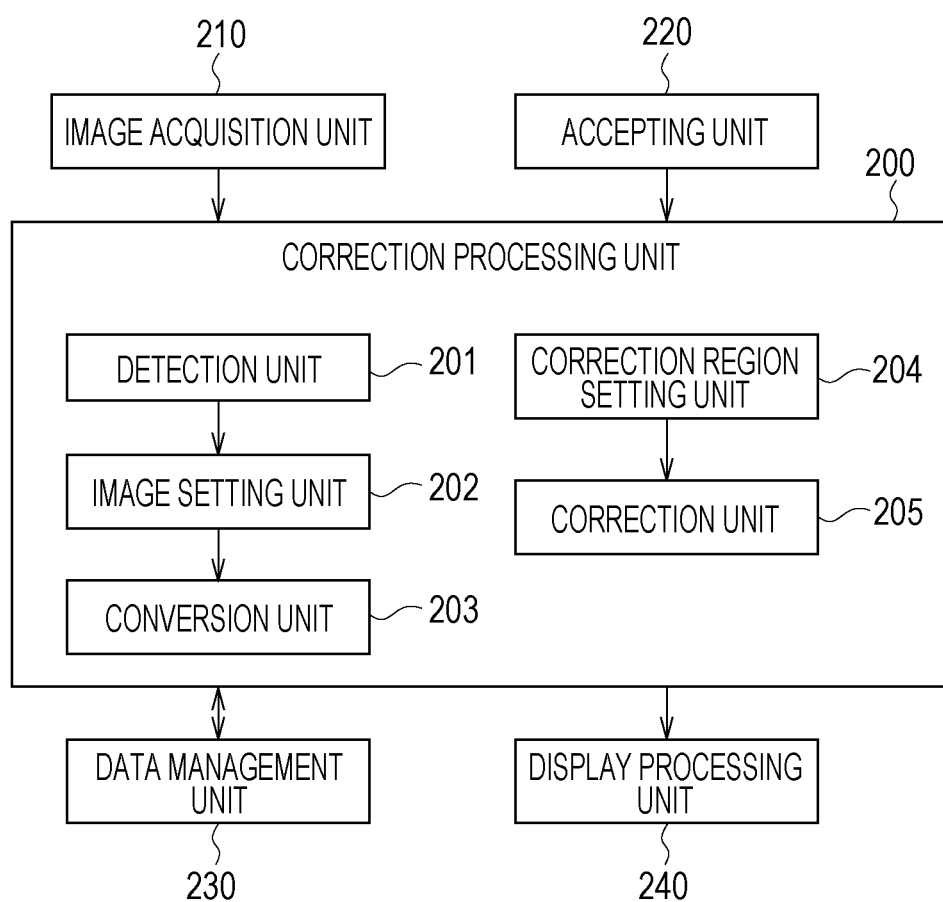
FIG. 2 is a functional configuration diagram of the image processing apparatus.

FIG. 2 is a functional configuration diagram of the image processing apparatus 100. The image processing apparatus 100 includes a correction processing unit 200, an image acquisition unit 210, an accepting unit 220, a data management unit 230, and a display processing unit 240. The image acquisition unit 210 acquires a captured image subjected to image-based inspection. For example, the image acquisition unit 210 may acquire a captured image received from an image capturing apparatus via the communication unit 107 or may acquire a captured image stored in the HDD 104 or the like.

The accepting unit 220 accepts various instructions or the like corresponding to user operations via the input unit 106. The data management unit 230 manages data of images or the like referred to by the correction processing unit 200. The display processing unit 240 displays various kinds of information such as an image. The correction processing unit 200 detects the detection target in the image acquired by the image acquisition unit 210 and also corrects a detection result. The correction processing unit 200 includes a detection unit 201, an image setting unit 202, a conversion unit 203, a correction region setting unit 204, and a correction unit 205. Note that processes performed by the individual units will be described with reference to FIG. 3.

Figure 3:
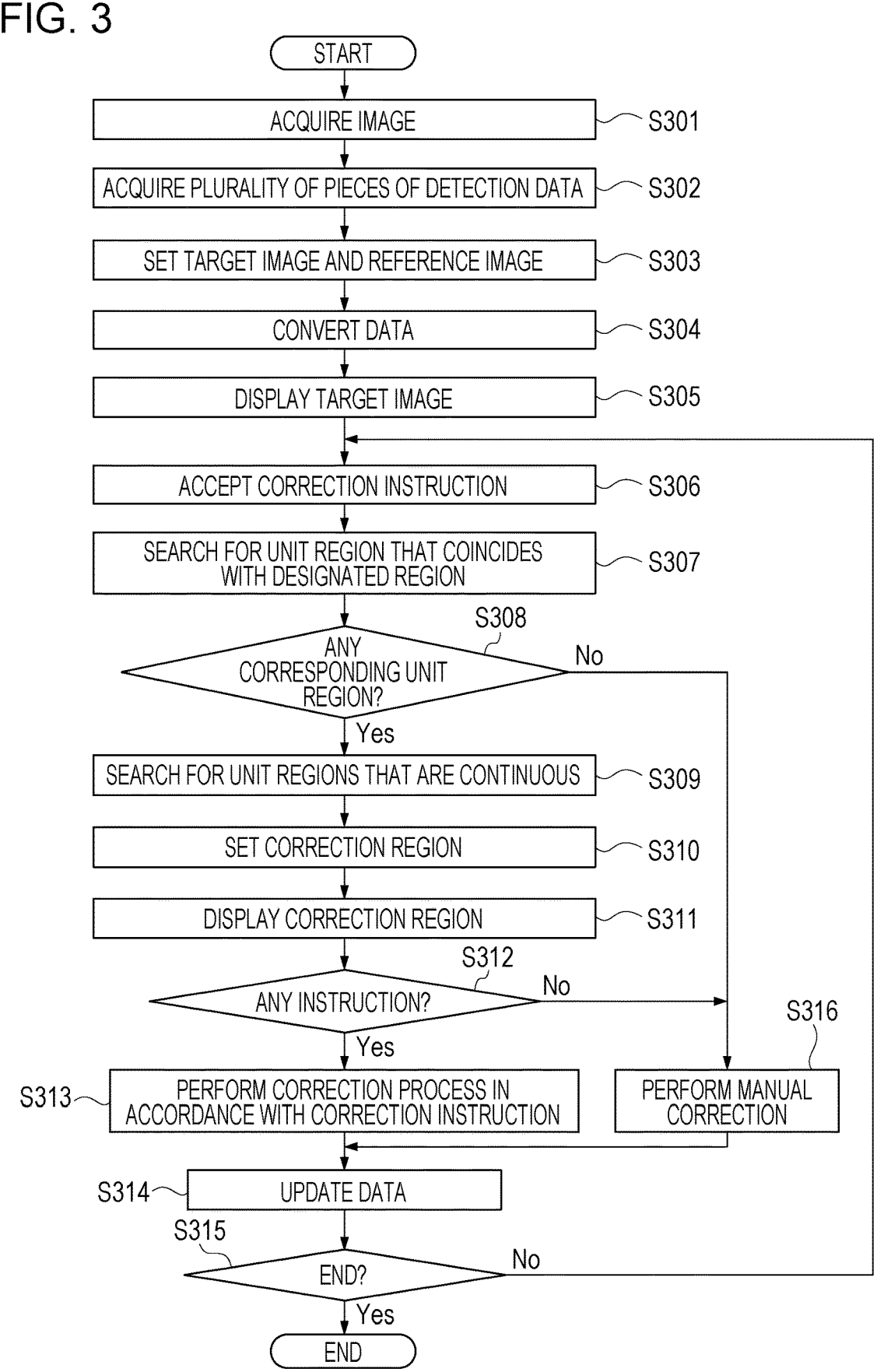
FIG. 3 is a flowchart illustrating a detection result correction process.

FIG. 3 is a flowchart illustrating a detection result correction process performed by the image processing apparatus 100. First in S301, the image acquisition unit 210 loads a captured image. Then in S302, the detection unit 201 of the correction processing unit 200 performs a detection process of detecting the detection target on the captured image to obtain a plurality of pieces of detection data. A piece of detection data is an image representing a probability of being the detection target (cracking) as the result of the detection process. Examples of the image representing a probability of being the detection target include a probability map and an edge image that are obtained by performing a recognition process and an edge extraction process on a captured image. These images store, for each pixel, a score or likelihood indicating the probability of being the detection target or an edge intensity.

Figure 4A:
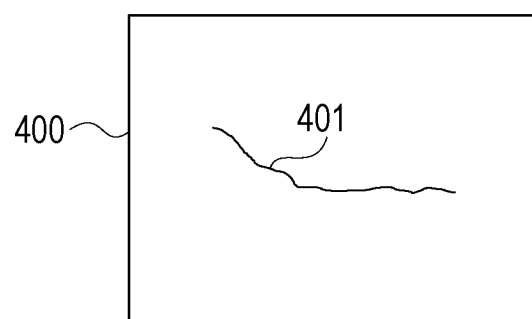
FIG. 4A is an explanatory diagram of a captured image.

FIGS. 4A to 4D are explanatory diagrams of a captured image and pieces of detection data. FIG. 4A is a diagram illustrating an example of a captured image 400. An image 401 is an image representing the detection target. The captured image 400 may be any image on which the detection process is yet to be performed. Examples of the captured image 400 include an RGB image and a grayscale image. The captured image 400 may also be an image obtained by performing image processing such as noise reduction on an RGB image or a grayscale image.

A piece of detection data is processed for use in subsequent processes. In the present embodiment, a threshold is set, and a binary image obtained by binarizing a piece of detection data using the threshold is prepared. Alternatively, data obtained by further performing thinning or polyline processing described later on the binary image or an image obtained by applying threshold-based processing on the piece of detection data may be prepared.

Figure 4B:
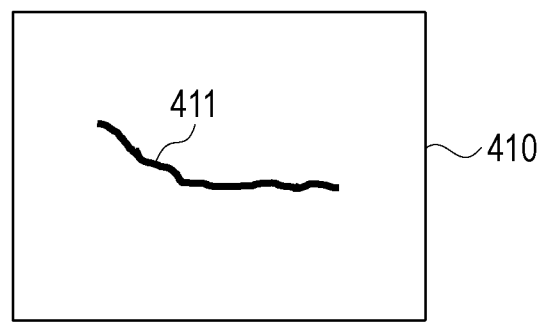
FIG. 4B is an explanatory diagram of detection data.
Figure 4C:
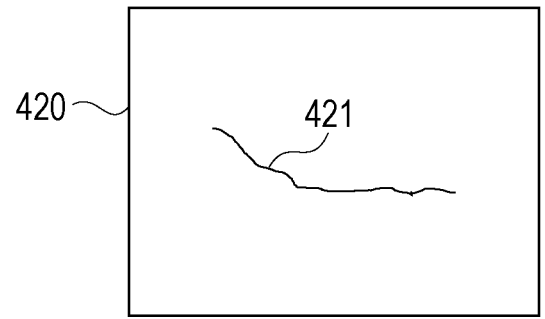
FIG. 4C is an explanatory diagram of detection data.
Figure 4D:
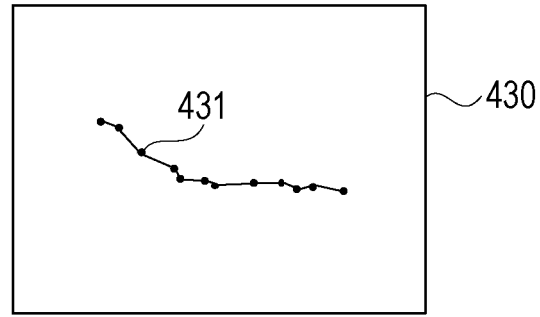
FIG. 4D is an explanatory diagram of detection data.

An image 410 illustrated in FIG. 4B is a binary image obtained by a binarization process. An image 420 illustrated in FIG. 4C is a thin-line image. An image 430 illustrated in FIG. 4D is a polyline image. All of the images 410, 420, and 430 are pieces of detection data obtained from the captured image 400. A region 411 (FIG. 4B), a line 421 (FIG. 4C), and a line including a point 431 (FIG. 4D) each represent a region in which it is determined that the detection target is detected. Note that, in the present embodiment, a region in which it is determined that the detection target is detected is referred to as a detected region irrespective of whether or not the detection result of the detection process is correct. A thin-line image can be obtained by performing a thinning process on a captured image. A polyline image is an image obtained by performing processing such as a vectorization process on the thin-line image. The polyline image includes location information of a detected region. Note that the point 431 in the polyline image 430 represents location information included in the polyline image 430. It is assumed that the polyline image 430 is represented by line segments linking adjacent points. Alternatively, the polyline image 430 may include mathematical expression information in addition to the location information and may be represented by a curve based on the mathematical expression information.

Referring back to FIG. 3, in S302, the detection unit 201 performs a binarization process based on a first threshold on the piece of detection data obtained by applying an edge extraction process or the like on the captured image, to obtain a first image in the present embodiment. The detection unit 201 further performs a binarization process based on a second threshold on the piece of detection data to obtain a second image. It is assumed herein that the second threshold is smaller in value than the first threshold. Then in step S303, the image setting unit 202 performs an image setting process of setting a target image and a reference image. The target image is an image in which a correction process is performed on a detected region obtained as the detection result, that is, an image subjected to the correction process. On the other hand, the reference image is an image that is referred to in the correction process. The target image is data to be updated through the correction process. The reference image is an image partly integrated into the target image. In the present embodiment, the image setting unit 202 sets, as the target image, the first image obtained by the binarization process based on the first threshold, and sets, as the reference image, the second image obtained by the binarization process based on the second threshold. That is, the target image is an image having undergone the binarization process based on the first threshold, whereas the reference image is an image having undergone the binarization process based on the second threshold.

Figure 5A:
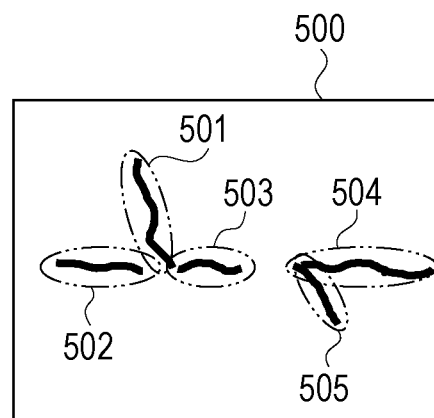
FIG. 5A is an explanatory diagram of a detection process and an image setting process.
Figure 5B:
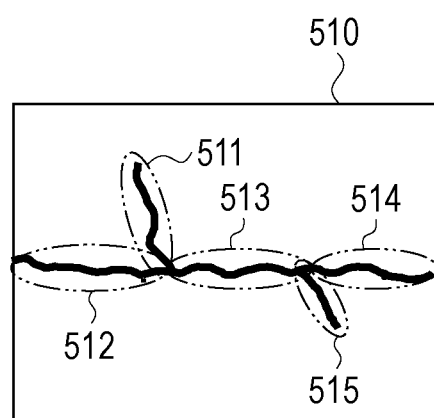
FIG. 5B is an explanatory diagram of the detection process and the image setting process.
Figure 6A:
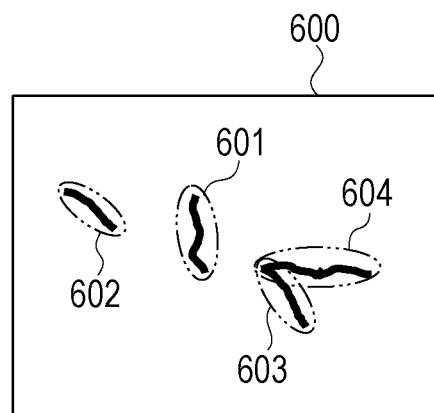
FIG. 6A is an explanatory diagram of the detection process and the image setting process.
Figure 6B:
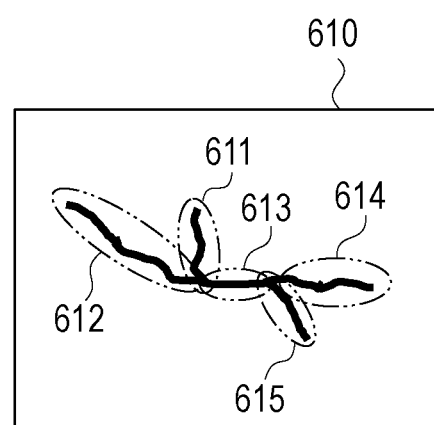
FIG. 6B is an explanatory diagram of the detection process and the image setting process.

FIGS. 5A to 6B are explanatory diagrams of the detection process performed in S302 and the image setting process performed in S303. Images 500 and 510 illustrated in FIGS. 5A and 5B are the target image and the reference image obtained by performing the binarization process based on the first threshold and the binarization process based on the second threshold on the same captured image, respectively. Likewise, images 600 and 610 illustrated in FIGS. 6A and 6B are the target image and the reference image obtained by performing the binarization process based on the first threshold and the binarization process based on the second threshold on the detection data obtained from the same captured image, respectively.

Detected regions 501 and 505 among the detected regions 501 to 505 in the target image 500 illustrated in FIG. 5A are regions that actually include cracking and for which the detection result is correct. In contrast, the detected regions 502, 503, and 504 are falsely detected regions. Detected regions 511 and 515 among the detected regions 511 to 515 in the reference image 510 illustrated in FIG. 5B are regions that actually include cracking and for which the detection result is correct. In contrast, the detected regions 512, 513, and 514 are falsely detected regions.

As indicated above, a falsely detected region tends to increase in a binary image when the threshold is decreased. In addition, detected regions tend to occur discontinuously in a fragmented state for one detection target when the threshold is increased, whereas the discontinuous regions tend to be coupled together and obtained as one continuous detected region when the threshold is decreased. The image processing apparatus 100 according to the present embodiment utilizes such tendencies, and sets, as the target image, the binary image corresponding to the first threshold for which noise relatively reduces, and sets, as the reference image, the binary image corresponding to the second threshold.

Referring back to FIG. 3, subsequently to the image setting process in S303, the conversion unit 203 of the correction processing unit 200 converts the detected region in the target image into unit regions and records information concerning the unit regions in S304. Likewise, the conversion unit 203 converts the detected region in the reference image into unit regions. A unit region is a unit of a detected region that is set to make it easier for the image processing apparatus 100 to handle the detected region. The unit region is the smallest unit of processing in the correction process described later. In the present embodiment, the conversion unit 203 sets, as a unit region, a range branching, at a position of a branch point, from a region where pixels at which the detection target is detected are consecutive. Further, the data management unit 230 generates information indicating the unit regions and stores this information in a storage unit such as the HDD 104.

Figure 7A:
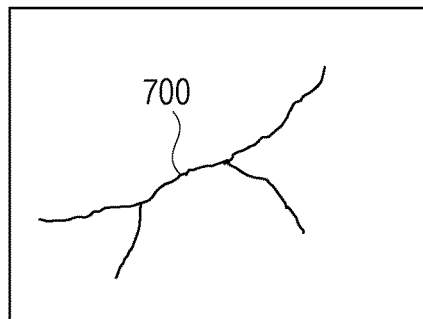
FIG. 7A is an explanatory diagram of a unit region determination method.
Figure 7B:
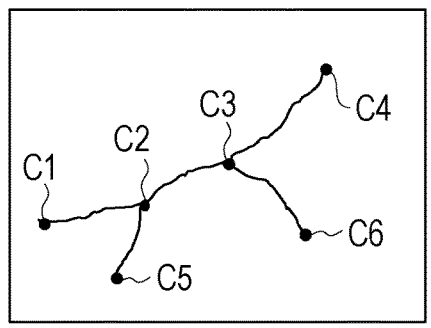
FIG. 7B is an explanatory diagram of the unit region determination method.

Referring now to FIGS. 7A to 7E, a unit region determination method will be described. The conversion unit 203 detects end points and branch points as boundary points in a detected region. When a detected region 700 illustrated in FIG. 7A is set as the processing target, points C1 to C6 are detected as boundary points as illustrated in FIG. 7B. Examples of the following processing include three methods described below.

Figure 7C:
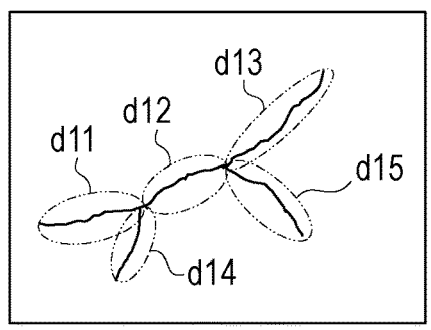
FIG. 7C is an explanatory diagram of the unit region determination method.
Figure 7D:
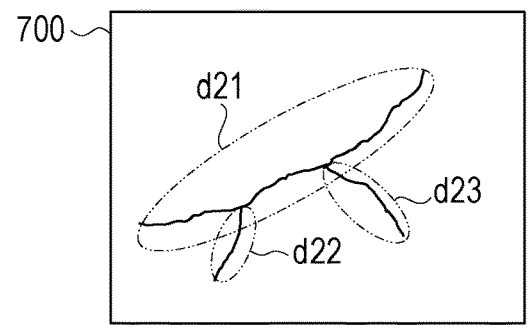
FIG. 7D is an explanatory diagram of the unit region determination method.

The first one is a method for segmenting a detected region at a branch point. A detected region from a certain boundary point to the closest boundary point is set as a unit region. Consequently, a detected region from the point C1 to the point C2 is set as a unit region d11 in the detected region 700 as illustrated in FIG. 7C. In addition, a detected region from the point C2 to the point C3 is set as a unit region d12. In the example illustrated in FIG. 7C, unit regions d13 to d15 are further set.

The second one is a method for segmenting a detected region by focusing on a main line. It is assumed that the main line is determined in accordance with conditions regarding information on the length and width of a detected region from a certain point to another certain point, for example. A detected region extending in a direction of the main line is set as one unit region. Further, a detected region that branches from the main line is set as a unit region different from the unit region extending in the direction of the main line. It is assumed that a portion from the point C1 to the point C4 is set as the main line in the example of FIG. 7D. In this case, a detected region that is continuous from the point C1 to the point C4 is set as one unit region d21 in the detected region 700. Further, a detected region from the point C2 to the point C5 that branches from the main line and a detected region from the point C3 to the point C6 that branches from the main line are set as unit regions d22 and d23, respectively.

Figure 7E:
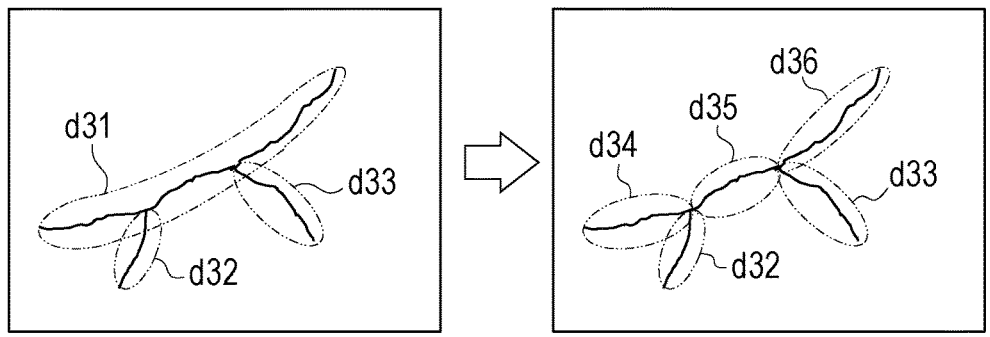
FIG. 7E is an explanatory diagram of the unit region determination method.

The third one is a combination of the two methods described above and is a method for applying the method for segmenting a detected region by focusing on the main line and for further segmenting the detected region at the branch points. A detected region is divided into one element extending in the direction of the main line and elements branching therefrom. Information concerning the continuous region at that time is held. In this state, data obtained by further segmenting the detected region at the branch points is managed as unit regions. FIG. 7E is an explanatory diagram of the processing of this example. The detected region 700 is first segmented into regions d31, d32, and d33. The regions d31, d32, and d33 are identical to the regions d21, d22, and d23 illustrated in FIG. 7D, respectively. Then, the region d31 is segmented into regions d34, d35, and d36 with information concerning the region d31 being held. The regions d34, d35, and d36 are identical to the regions d11, d12, and d13 illustrated in FIG. 7C, respectively. Consequently, the unit regions d32, d33, d34, d35, and d36 are obtained.

It is assumed that the conversion unit 203 according to the present embodiment converts the detected region into the unit regions by using the third method described above. FIG. 8 is a diagram illustrating an example of information concerning unit regions that is recorded by the conversion unit 203. The conversion unit 203 records information indicating the location of each unit region and information concerning a continuous region, as information concerning the unit region. The continuous region refers to regions, such as the unit regions d34, d35, and d36 described in FIG. 7E, that are handled as one continuous region when the main line is focused on. The conversion unit 203 records the information concerning the continuous region. Thus, the conversion unit 203 can set a plurality of unit regions as one continuous region. This processing is an example of a continuous region setting process.

Data illustrated in FIG. 8 corresponds to the unit regions illustrated in FIG. 7E. Each unit region has a data number for identifying the unit region and coordinate information of a location where the unit region is located. Coordinate information is given in a format of $(X_{i,j,k}, Y_{i,j,k})$, and an amount of the coordinate information of each unit region is dependent on the size of the unit region. Indices i, j, and k will be described below. The index i is a number assigned to data resulting from segmentation when the method for segmenting a detected region by focusing on the main line is applied. That is, it is indicated that a plurality of unit regions having the equal index i form one continuous region (one main line in the present embodiment). In the example of FIG. 8, a value of 1 is set in common in the index i of the unit regions d34, d35, and d36; 2 is set in the index i of the unit region d32; and 3 is set in the index i of the unit region d33.

The index j is a number assigned to data resulting from segmentation based on the method for segmenting a detected region at branch points, that is, a number assigned to each unit region. The index k is a number indicating a coordinate where each unit region is located. When p denotes the number of coordinates included in the unit region d34, the unit region d34 has p pieces of coordinate data. The storage order of the coordinates is such that the index k is equal to 1 at one end point, the coordinates are arranged sequentially from the coordinate closest to the end point, and the index k is equal to p at the other end point.

Referring back to FIG. 3, in S305, the display processing unit 240 performs a display process of superimposing the target image on the captured image and displaying the resultant image on the display unit 105. This allows a user to check the detection result obtained by the detection process. The user can input a region in which the user desires to correct the detection result. At that time, the user also designates a type of the correction process. Examples of the type of the correction process include deletion of a detected region and coupling of a plurality of detected regions. In S306, the accepting unit 220 accepts an instruction for correcting the detection result in response to a user operation. The correction instruction includes the type of the correction process and information for designating a region to be corrected. The correction instruction is an example of an instruction for performing a predetermined correction process with at least one region designated. For example, when trace of formwork is falsely detected, the user inputs a deletion correction instruction in which this region is designated. In addition, when part of cracking is not detected regardless of the fact that the cracking is recognizable, the user inputs a coupling correction instruction in which this region is designated.

Figure 9:
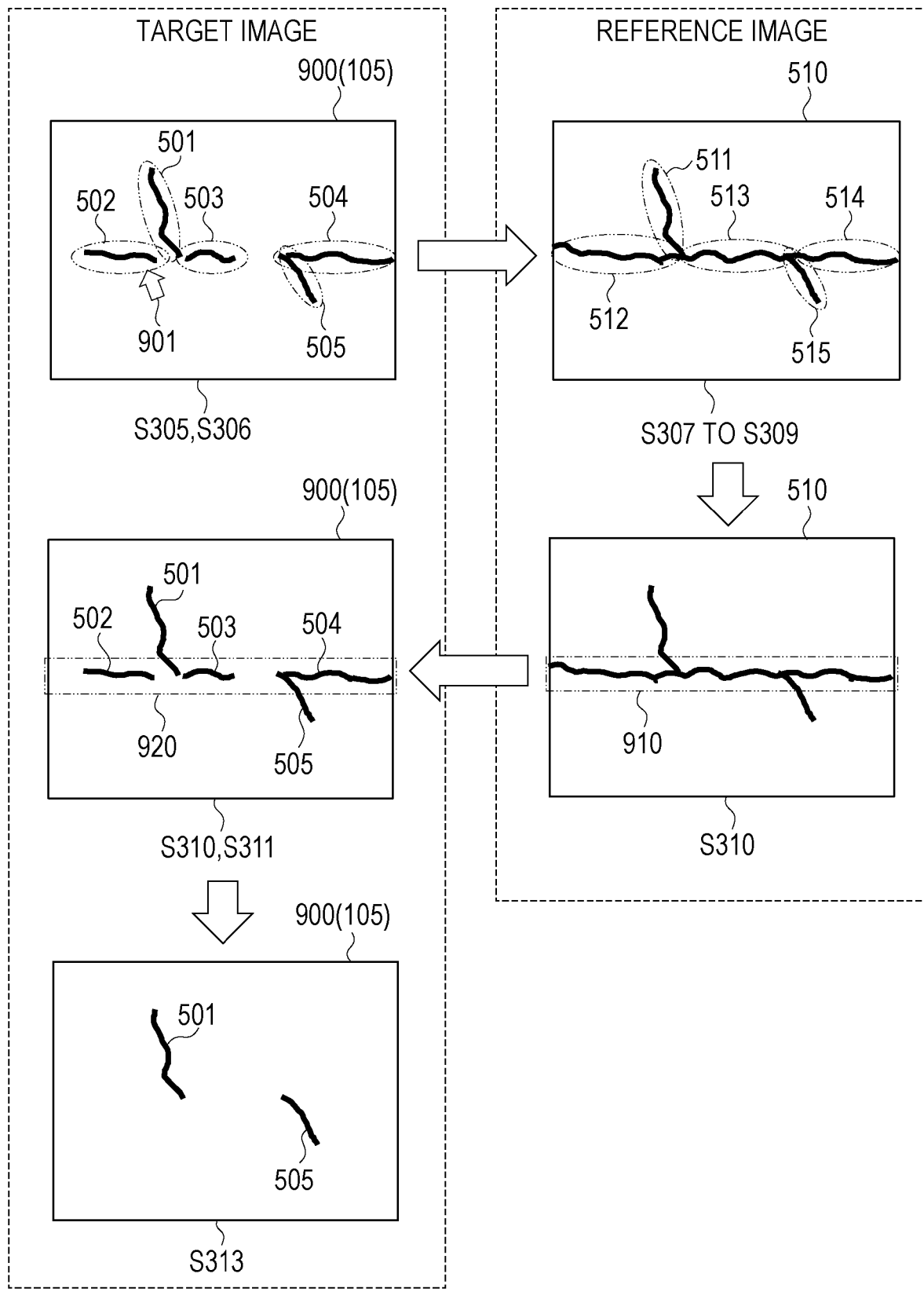
FIG. 9 is an explanatory diagram of a display process and subsequent processes.

The display process in S305 and subsequent processes will be described with reference to FIG. 9. An image 900 at an upper left position in FIG. 9 is an example of an image displayed in S305. The image 900 is an image obtained by superimposing the target image on the captured image. The image 900 is obtained by superimposing the target image 500 illustrated in FIG. 5A on the corresponding captured image. Subsequent processes will be described of the case where a deletion correction instruction is accepted for the image 900 by way of example. Note that it is assumed that the detected regions 501, 502, 503, 504, and 505 are set as unit regions in the target image 500.

In addition, the reference image 510 at an upper right position in FIG. 9 is the same as the reference image 510 illustrated in FIG. 5B. It is assumed that the detected regions 511, 512, 513, 514, and 515 are set as unit regions in the reference image 510. It is also assumed that the detected regions 512, 513, and 514 are set as one continuous region.

In the image 900 displayed on the display unit 105, a user selects the unit region 502 with a mouse pointer 901 and inputs a deletion instruction. Then in S306, the accepting unit 220 accepts a deletion correction instruction in which the unit region 502 is designated. A region that is designated in the target image in the correction instruction and that is used in the search in the reference image is referred to as a designated region. In the case where the unit region 502 is selected with the mouse pointer 901, the unit region 502 alone may be set as the designated region or not only the unit region 502 but also a region within a predetermined range from the unit region 502 may be set as the designated region. It is assumed in the present embodiment that designation of a region and a type of the correction process are concurrently accepted as a correction instruction; however, the timings at which designation of a region and a type of the correction process are accepted are not limited to the present embodiment. Alternatively, the type of the correction process may be accepted after designation of a region is accepted, or the order may be opposite.

Referring back to FIG. 3, subsequently to the process of accepting the correction instruction in S306, the correction region setting unit 204 searches the reference image for a unit region corresponding to the unit region 502 relating to the correction instruction, that is, the designated region in S307. Specifically, the correction region setting unit 204 detects a unit region that at least partly coincides with the designated region. If the unit region corresponding to the designated region is detected in the reference image by the correction region setting unit 204 in S308 (Yes in S308), the process proceeds to S309. If the unit region corresponding to the designated region is not detected in the reference image by the correction region setting unit 204 (No in S308), the process proceeds to S316. In S316, the correction unit 205 performs the correction process (manual correction) in accordance with a user operation. The process then proceeds to S314.

In S309, the correction region setting unit 204 identifies a continuous region including the unit region detected in the reference image on the basis of the index i illustrated in FIG. 8 and searches for each unit region included in this continuous region. Then in S310, the correction region setting unit 204 sets, as a correction region, the region (continuous region) constituted by the unit regions detected in S308 and S309. Note that the correction region setting unit 204 may set, as the correction region, a region corresponding to a region including not only the continuous region but also a peripheral portion of the continuous region. The correction region setting unit 204 further sets, as a correction region, a region in the target image that corresponds to the correction region in the reference image. This process is an example of a correction region setting process of setting two or more unit regions (detected regions) as one correction region.

Then in S311, the display processing unit 240 performs control to further superimpose the correction region in the target image on the captured image that is being displayed on the display unit 105 with the target image superimposed thereon and display the resultant image. This process is an example of a correction region display process. A continuous region is a region that is highly likely to correspond to the same detection target, and it is highly likely to be appropriate to perform the correction process equally on each of a plurality of unit regions included in the continuous region. Accordingly, in the present embodiment, the correction region is displayed to have the user confirm the correction region before the correction process is collectively performed on the continuous region.

In the example of FIG. 9, when the unit region 502 is selected, the unit region 512 corresponding to the unit region 502 is detected in the reference image 510 in S307. Further, the unit regions 513 and 514 that form one continuous region together with the unit region 512 are detected in S309. Subsequently in S310, the three unit regions 512, 513, and 514 are set as one correction region 910, and a correction region 920 corresponding to the correction region 910 is set in the target image. Then in S311, the correction region 920 corresponding to the correction region 910 is superimposed on the image 900 and the resultant image is displayed. Note that the display processing unit 240 may display the unit regions 502, 503, and 504 as well as the correction region 920 in a color different from that of the other unit regions in S311. In addition, the display processing unit 240 may display the unit regions 502, 503, and 504 in a coupled state to be one region. Such display allows the user to easily understand a portion to be corrected.

Referring back to FIG. 3, subsequently to the correction region display process in S311, the accepting unit 220 determines in S312 whether or not it accepts, in response to a user operation, a confirmation instruction for confirming the correction region 920 displayed in S311 as the correction region. If the accepting unit 220 accepts the confirmation instruction (Yes in S312), the process proceeds to S313. If the accepting unit 220 does not accept the confirmation instruction (No in S312), the process proceeds to S316. In S316, the correction region setting unit 204 identifies the correction region in accordance with the user operation, and the correction unit 205 performs the type of the correction process corresponding to the user operation on the correction region. The process then proceeds to S314. For example, when the accepting unit 220 accepts an instruction to modify the correction region 920 without accepting the confirmation instruction in S312, the process proceeds to S316. In this case, in S316, the correction region setting unit 204 modifies the correction region in accordance with the modification instruction.

On the other hand, in S313, the correction unit 205 performs the correction process on the unit regions included in the correction region in the target image in accordance with the correction instruction accepted in S306. The display processing unit 240 performs control to display, on the display unit 105, the captured image on which the corrected target image is superimposed. In the example of FIG. 9, the modification instruction is not given for the correction region 920, and the unit regions 502, 503, and 504 are deleted in the correction process. Consequently, the unit regions 501 and 505 alone remain as the detected regions.

Note that in S313 the correction unit 205 may perform the correction process all at once in the correction region, or whether to perform the correction process all at once or separately a plurality of number of times may be made selectable. When the user selects that the correction process is to be performed separately a plurality of number of times, the correction unit 205 deletes the unit regions one by one sequentially from the one closer to the designated region, for example. For example, in the example of FIG. 9, the unit region 502 is deleted, and thereafter, the unit regions 503 and 504 are deleted sequentially. Alternatively, the correction unit 205 may delete the unit regions in an order according to an instruction given by the user.

Referring back to FIG. 3, subsequently to the correction process in S313, in S314, the data management unit 230 updates the information concerning the unit regions in response to the correction process in S313. Then in S315, the accepting unit 220 checks whether or not it accepts an end instruction. If the accepting unit 220 accepts the end instruction (Yes in S315), the detection result correction process ends. If the accepting unit 220 does not accept the end instruction (No in S315), the process proceeds to S306.

Figure 10:
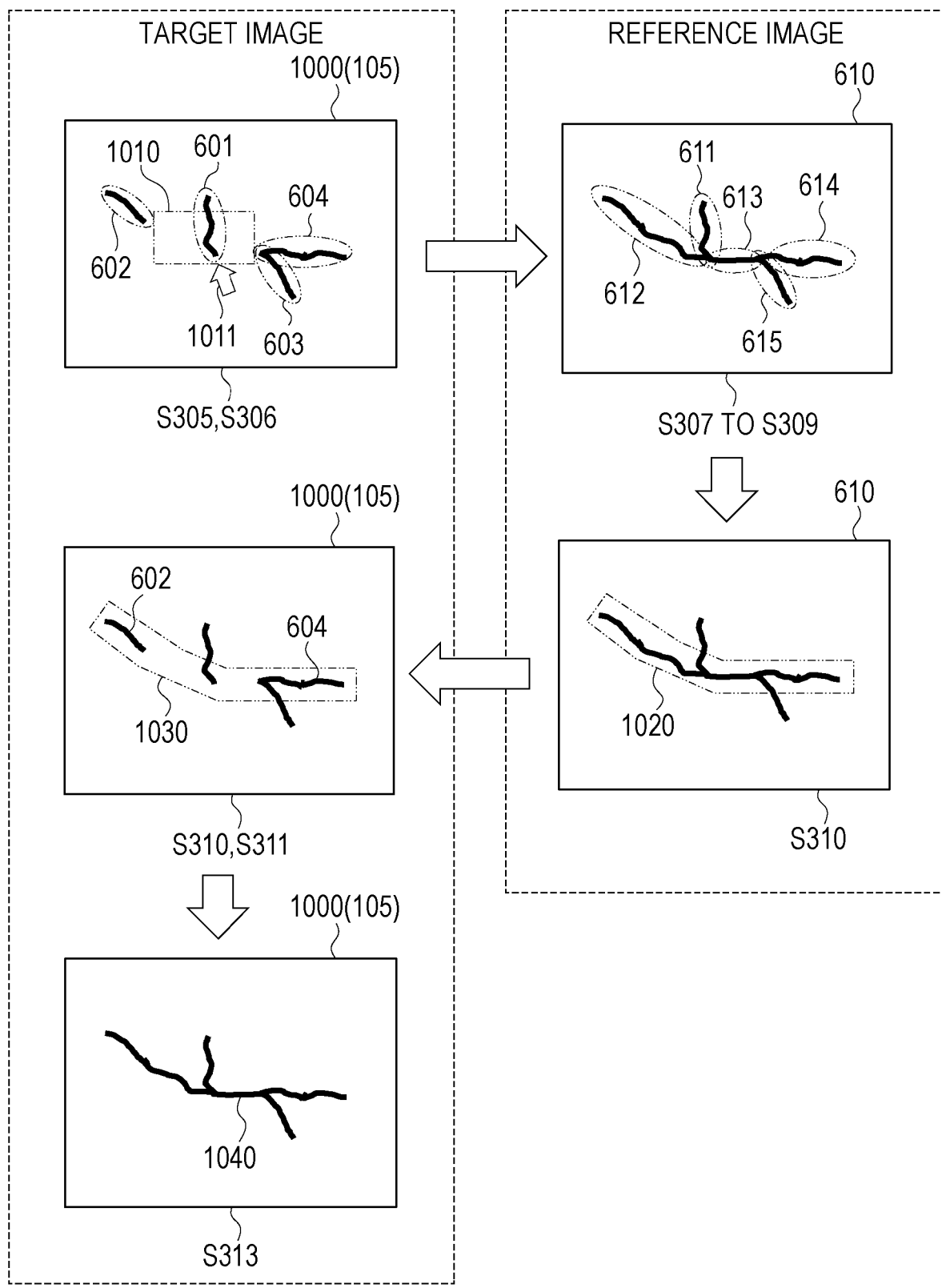
FIG. 10 is an explanatory diagram of the display process and the subsequent processes.
Figure 11A:
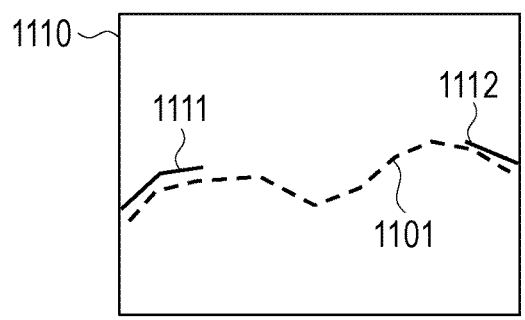
FIG. 11A is a diagram illustrating a pattern of a shape of a detected region.
Figure 11B:
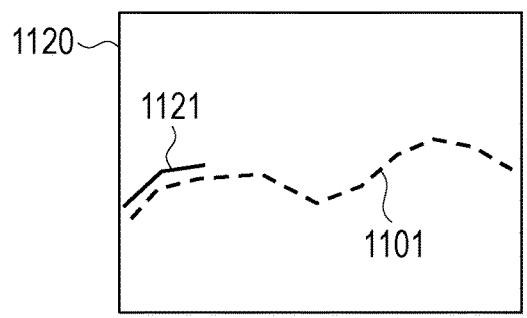
FIG. 11B is a diagram illustrating a pattern of the shape of the detected region.
Figure 11C:
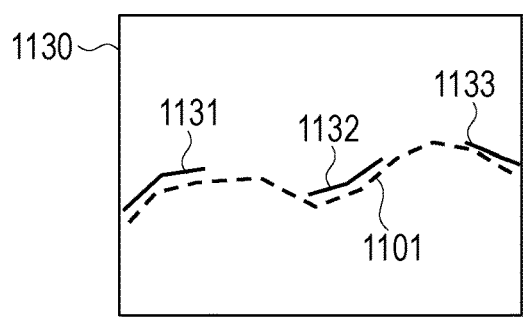
FIG. 11C is a diagram illustrating a pattern of the shape of the detected region.
Figure 11D:
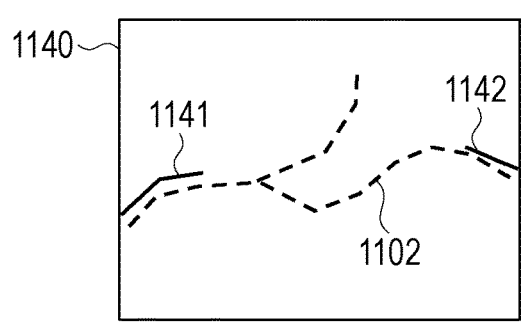
FIG. 11D is a diagram illustrating a pattern of the shape of the detected region.
Figure 11E:
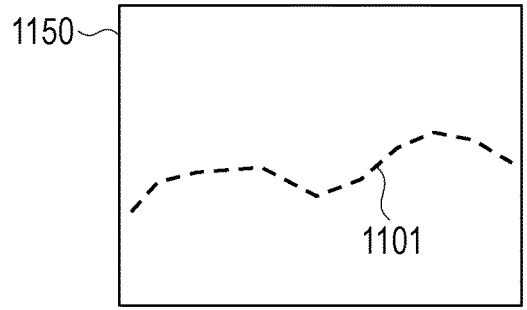
FIG. 11E is a diagram illustrating a pattern of the shape of the detected region.

The processes from S305 performed in the case where the correction process is a coupling process will be described next with reference to FIG. 10. An image 1000 at an upper left position in FIG. 10 is an example of the image displayed in S305. The image 1000 is obtained by superimposing the target image 600 illustrated in FIG. 6A on the corresponding captured image. It is assumed that a coupling correction instruction is accepted for the image 1000. It is also assumed that detected regions 601, 602, 603, and 604 are set as unit regions in the target image 600. The reference image 610 at an upper right position in FIG. 10 is the same as the reference image 610 illustrated in FIG. 6B. It is assumed that detected regions 611, 612, 613, 614, and 615 are set as unit regions in the reference image 610. It is also assumed that the detected regions 612, 613, and 614 are set as one continuous region.

When a user selects, with a mouse pointer 1011, a lacking region 1010 of a detected region as a portion to be coupled, the reference image is searched for unit regions in S307. The unit regions 612 and 613 that partly coincide with the lacking region 1010 are detected in the reference image 610. The unit region 614 that forms one continuous region together with the unit regions 612 and 613 is further detected in S309. Then in S310, the unit regions 612, 613, and 614 are set as one correction region 1020, and a correction region 1030 corresponding to the correction region 1020 is also set in the target image. Then in S311, the correction region 1030 corresponding to the correction region 1020 is superimposed on the image 1000 and the resultant image is displayed. Then in S313, the unit regions 602 and 604 in the correction region 1030 are coupled and are displayed as one detected region 1040. The image processing apparatus 100 is also capable of displaying a unit region having a predetermined length or greater in the image after displaying the detected region 1040, by holding the data in a format of unit region. This allows the user to easily find a particular detection result.

Patterns of the shape of the detected region will be described next with reference to FIGS. 11A to 11E. There are various patterns of the shape of the detected region. Target images 1110, 1120, 1130, 1140, and 1150 illustrated in FIGS. 11A to 11E each represent a conceptual target image. In FIGS. 11A to 11E, a solid line denotes a detected region in the target image, and a broken line denotes a corresponding detected region in the reference image. In addition, the detected region in the target image and the corresponding detected region in the reference image coincide with each other in reality; however, they are shifted from each other in FIGS. 11A to 11E in consideration of ease of viewing.

There are patterns as illustrated in the respective images in terms of the shape of the detected region. In the target image 1110, two detected regions 1111 and 1112 corresponding to a detected region 1101 in the corresponding reference image are detected, and there is a lacking region between the two detected regions 1111 and 1112. In the target image 1120, only one detected region 1121 corresponding to a part of the detected region 1101 in the reference image is detected. In the target image 1130, three detected regions 1131, 1132, and 1133 are detected along the detected region 1101 in the reference image, and there are lacking regions between the detected regions 1131, 1132, and 1133. The target image 1140 is an example in which a branching detected region 1102 is obtained in the corresponding reference image. In the target image 1140, detected regions 1141 and 1142 are detected, and there is a lacking region between the detected regions 1141 and 1142. The detected region 1101 is detected in the reference image, whereas there is no detected region in the target image 1150. All the patterns can be corrected by designating a range and a position in the target image using a user interface described below.

Figure 12A:
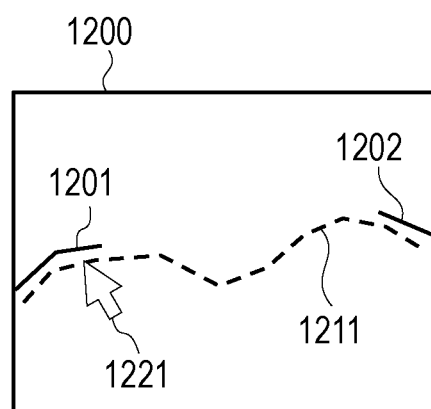
FIG. 12A is an explanatory diagram of a user operation.
Figure 12B:
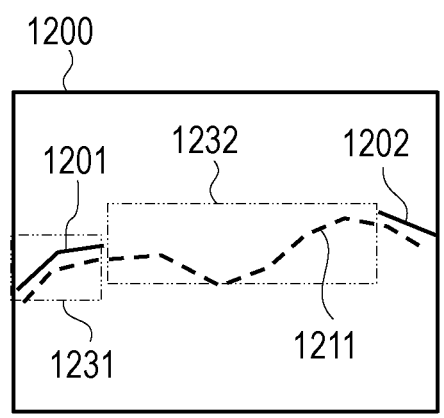
FIG. 12B is an explanatory diagram of a user operation.

A user operation performed when the user designates a region relating to a correction instruction (designated region) will be described next with reference to FIGS. 12A and 12B. FIGS. 12A and 12B illustrate an identical target image 1200 that is an image showing unit regions 1201 and 1202. In FIGS. 12A and 12B, a solid line denotes a detected region in the target image, and a broken line denotes a corresponding detected region in the reference image as in FIGS. 11A to 11E. In addition, the detected region in the target image and the corresponding detected region in the reference image coincide with each other in reality; however, they are shifted from each other in FIGS. 12A and 12B in consideration of ease of viewing.

Suppose that the user desires to delete or couple the unit regions 1201 and 1202. The first user operation performed in this case may be a method for selecting the designated region by clicking the mouse. This is an operation for placing the mouse pointer near the portion to be corrected in the target image and clicking on one or more positions. This method allows the user to select not only a unit region but also a lacking region in the target image. For example, as illustrated in FIG. 12A, the user places a mouse pointer 1221 near the unit region 1201 and clicks the mouse. In this way, the user can associate the designated region with a unit region 1211 in the reference image.

Note that the user may click on two positions, i.e., the unit regions 1201 and 1202. In addition, when the user selects a lacking region, the user places the mouse pointer 1221 near the lacking region between the unit regions 1201 and 1202 and clicks on the position. In this way, the user can associate the designated region with the unit region 1211 that is close to the clicked position in the reference image.

The second user operation may be a method for selecting a desired region by dragging the mouse. The user drags the mouse at a position near a region which the user desires to select in the target image, for example, from the upper left portion to the lower right portion. Consequently, a rectangular region having opposing vertices at positions where the mouse pointer is located when the dragging is started and ended is set as a correction region. The reference image is searched for a unit region partly included in the rectangular region. This method is also usable in selection of a unit region and selection of a lacking region. For example, as illustrated in FIG. 12B, the user drags the mouse at a position near the unit region 1201 in the target image 1200. Consequently, a rectangular region 1231 having vertices at positions where the mouse pointer is located when the dragging is started and ended is set as the designated region. Then, the unit region 1211 that partly coincides with the rectangular region 1231 is successfully found in the reference image. Note that when the user drags the mouse, a rectangle including the unit region 1211 alone may be selected or a rectangle including the plurality of unit regions 1201 and 1202 may be selected.

When selecting a lacking region, the user drags the mouse, for example, at a position near the lacking region between the unit regions 1201 and 1202. Consequently, a rectangular region 1232 having vertices at positions where the mouse pointer is located when the dragging is started and ended is set as the designated region. Then, the unit region 1211 that partly coincides with the designated region in the reference image is successfully found. The method for selecting a lacking region among the methods described above may be used when the detection target that is successfully detected in the reference image is not detected in the target image as in the target image 1150 illustrated in FIG. 11E.

As described above, the image processing apparatus 100 according to the present embodiment is capable of automatically setting, as a continuous detected region, detected regions that are detected in a discontinuous state. This allows the user to refer to a continuous detected region and visually check a false positive and a false negative easily. Further, the image processing apparatus 100 is capable of performing the correction process collectively on the regions that are set as the continuous detected region. This can save the user from doing sensitive correction work, such as selecting one by one a plurality of detected regions that are detected in a discontinuous state, at the time of correction.

For example, falsely detected regions and falsely undetected regions occur in a fragmented state at the time of detection of cracking from an image of the wall of a structure. Sensitive work for manually removing falsely detected regions and work for tracing falsely undetected regions are required after the detection. In particular, the work for deleting detected regions that occur in a fragmented state by selecting the detected regions one by one is troublesome. However, the image processing apparatus 100 according to the present embodiment is capable of regarding, as being coupled, fragmented detected regions that are anticipated to be continuous, and performing correction such as deletion or coupling all at once. This saves the user from selecting falsely detected regions one by one and can reduce the number of times of the operation.

Further, the image processing apparatus 100 is capable of managing, as one continuous region, detected regions that are detected in a discontinuous state. This makes it possible to easily and appropriately summarize and manage data after the correction. Furthermore, the image processing apparatus 100 manages detected regions in units of unit regions. This can make it easier to summarize the number of cracks and measure the length of each of the cracks than in the case of managing the positions of the cracks in units of pixels.

Figure 13:
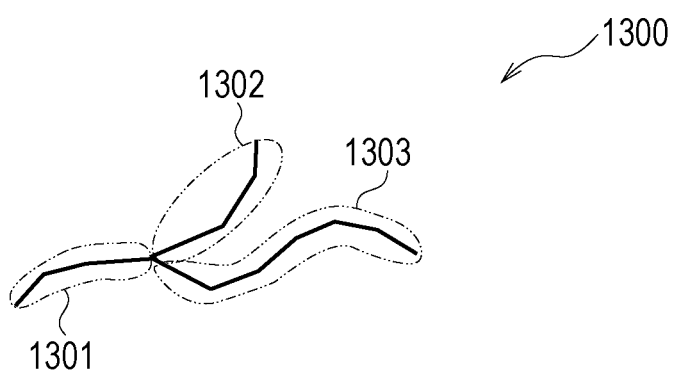
FIG. 13 is a diagram illustrating a continuous region according to a first modification.

In a first modification of the first embodiment, setting of a continuous region is not limited to the embodiment. Alternatively, one continuous detected region may be set as a continuous region irrespective of presence or absence of branches as illustrated in FIG. 13. For example, in a detected region 1300 illustrated in FIG. 13, unit regions 1301, 1302, and 1303 are set as one continuous region.

FIGS. 14A to 14D are explanatory diagrams of user operations performed when the user designates a region that corresponds to the continuous region illustrated in FIG. 13 and relates to a correction instruction. FIGS. 14A to 14D illustrate an identical target image 1400 that includes two unit regions 1401 and 1402. In FIGS. 14A to 14D, as in FIGS. 11A to 12B, a solid line denotes a detected region in the target image, and a broken line denotes a corresponding detected region in the reference image. In addition, the detected region in the target image and the corresponding detected region in the reference image coincide with each other in reality; however, they are shifted from each other in FIGS. 14A to 14D in consideration of ease of viewing. The detected region in the reference image corresponding to the target image 1400 is the same as the continuous region illustrated in FIG. 13.

Suppose that the user desires to delete or couple the unit regions 1401 and 1402. The first user operation performed in this case may be a method for displaying a candidate line of a unit region in accordance with a position of the mouse pointer to allow the user to select a desired candidate line. When there are a plurality of unit regions near the position of the mouse pointer, a unit region closest to the position of the mouse pointer is displayed as a candidate line. A condition under which the candidate line is displayed may be in accordance with any method. For example, the condition may be a distance from the position of the mouse pointer to the closest point in the unit region being less than a predetermined number of pixels. In the example illustrated in FIG. 14A, a mouse pointer 1411 in the target image 1400 is closer to the unit region 1303 than to the unit region 1302. Thus, a candidate line 1412 corresponding to the unit region 1303 is displayed. The user confirms selection of the unit region 1303 by clicking on the candidate line 1412.

Figure 14A:
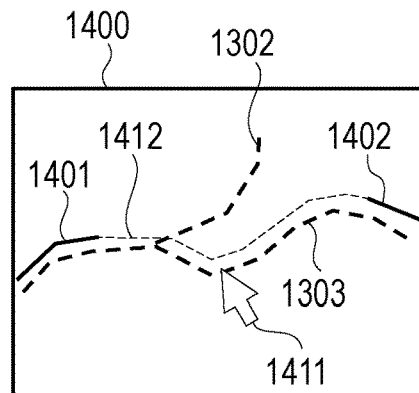
FIG. 14A is an explanatory diagram of a user operation according to the first modification.
Figure 14B:
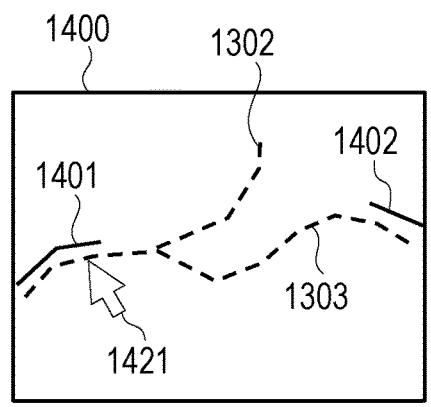
FIG. 14B is an explanatory diagram of a user operation according to the first modification.

The second user operation may be a method for selecting one or more unit regions in the target image with the mouse pointer. A method for selecting one unit region and a method for selecting two or more unit regions will be described herein. It is assumed that the user selects the unit region 1401 in the target image 1400 with a mouse pointer 1421 as illustrated in FIG. 14B, as an example of the case of selecting one unit region. At that time, one of the unit regions 1302 and 1303 is selected and displayed at random as a candidate line. When a unit region at the desired position is selected, the user confirms the selection of the unit region by performing an operation such as clicking the mouse or pressing a given key of a keyboard. When the unit region at the desired position is not selected, the user performs an operation such as moving a mouse wheel or pressing a given key of a keyboard. In this way, the candidate line is switched to a candidate line for another unit region. When the candidate line consequently appears at the desired position, the user confirms the selection of the unit region.

It is assumed that the user selects the two unit regions 1401 and 1402 with the mouse pointer 1421, as an example of the case of selecting two or more unit regions. Then, the unit region 1303 that correspond to both of the selected unit regions is selected in the reference image. The method used in such selection of a plurality of unit regions is not limited to selection by clicking, and a method for dragging the mouse over or around the plurality of unit regions may be used. For example, the unit region 1303 may be selected by dragging the mouse from a point near the unit region 1401 to a point near the unit region 1402.

Figure 14C:
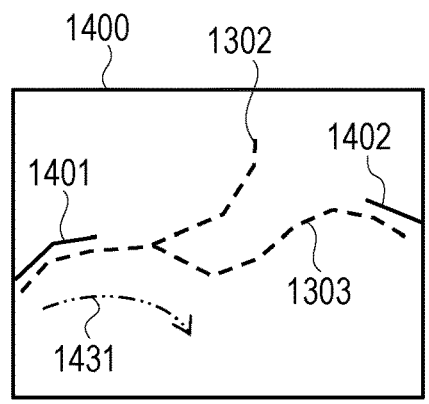
FIG. 14C is an explanatory diagram of a user operation according to the first modification.

The third user operation may be a method for selecting unit regions in accordance with a direction in which the mouse is dragged. As illustrated in FIG. 14C, the user locates the mouse pointer near the unit region 1401 and drags the mouse in a direction indicated by a two-dot dash line 1431. In this case, dragging direction information is compared with direction information of the unit region 1302 and direction information of the unit region 1303 in the reference image, and a unit region in a closer direction is selected. For example, a direction of a vector of a dragging movement can be defined by the start position and the end position of the dragging, and a direction of a vector of each unit region can be defined by two ends points of the unit region. In this way, the unit region 1303 in the closer direction is selected.

Figure 14D:
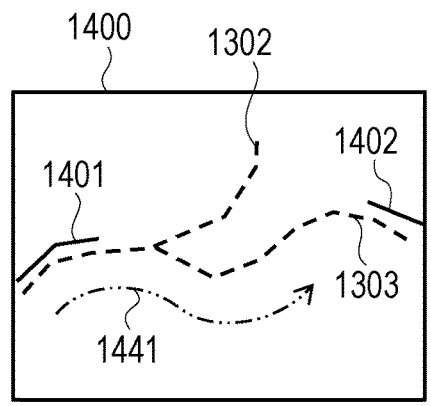
FIG. 14D is an explanatory diagram of a user operation according to the first modification.

The fourth user operation may be a method for selecting a unit region having a shape resembling a mouse dragging movement. Suppose that the user sets a point near the unit region 1401 as the start point and drags the mouse to draw a path as indicated by a two-dot dash line 1441 as illustrated in FIG. 14D. Then, the shape of the path of the dragging is compared with shapes of unit regions in the reference image, and a unit region having a more resembling shape is selected from among the unit regions 1302 and 1303 in the reference image. Specifically, a vector of a dragging movement is determined by the start position and the end position of the dragging. In addition, a vector of each unit region is determined by the end points of the unit region. Then, an inner product of the vector of the dragging movement and the vector of each unit region is determined. By selecting a unit region whose inner product is greater, a unit region that is more resembling in terms of the length and the direction is successfully selected. In this example, the unit region 1303 is selected.

In a second modification, the detection data may be polyline data. Since polyline data is data obtained by representing a detected region as a collection of data, each polyline can be regarded as a unit region. When an image resulting from a binarization process such as a probability map or an edge image is used as the detection data, correction can be made by removing a unit region in the reference image from the target image or by superimposing a unit region in the reference image on the target image. However, when a thin-line image or polyline data is used as the detection data, the target image and the reference image cannot be integrated together by a simple superimposition process. A reason for this is that when thin-line images are created from binary images based on different thresholds, the positions of a detected region may shift from each other. For this reason, positions of a point in pieces of polyline data obtained from the thin-line images shift from each other.

Therefore, a problem arises in terms of a method for integrating the target image and the reference image together when thin-line images or pieces of polyline data are used as detection data. A correction method applicable to these pieces of detection data will be described below with reference to FIGS. 15A to 15C illustrating methods for correcting polyline data.

Figure 15A:
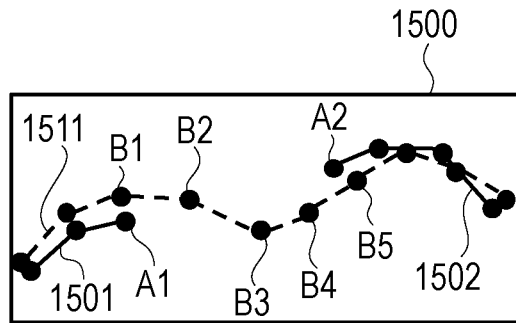
FIG. 15A is an explanatory diagram of the correction process for polyline data.
Figure 15B:
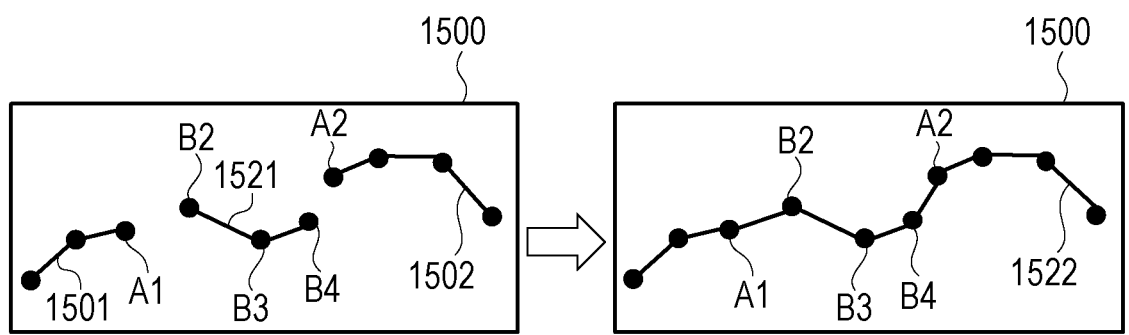
FIG. 15B is an explanatory diagram of the correction process for polyline data.
Figure 15C:
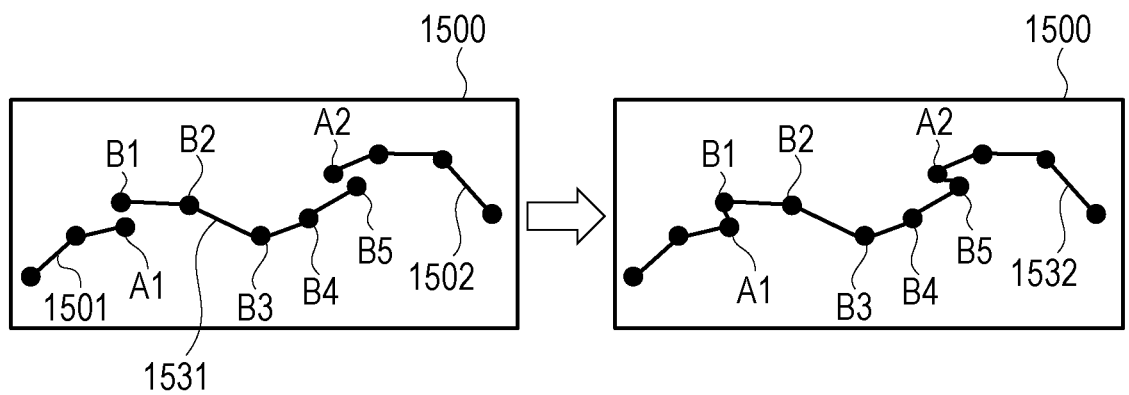
FIG. 15C is an explanatory diagram of the correction process for polyline data.

A target image 1500 illustrated in FIG. 15A includes two unit regions 1501 and 1502. A unit region 1511 represented by a broken line is a unit region in a reference image. For convenience of explanation, the unit region 1511 is superimposed and displayed on the target image 1500; however, it is assumed that the unit region 1511 is not actually seen in the target image 1500. Points (A1, A2, and B1 to B5) in the unit regions 1501 and 1502 and the unit region 1511 each represent coordinate data of the polyline data. The unit regions 1501 and 1502 and the unit region 1511 in FIG. 15A are regions obtained for the same detection target but have coordinate positions shifted from each other. A method for integrating the target image and the reference image together will be described below sequentially for the deletion process and the coupling process.

When polyline data is used as the detection data, the integration method performed in the deletion process may be the same as that performed in the case of using binary images. Suppose that the user selects the unit region 1501 as a deletion target, for example. In this case, the correction region setting unit 204 first sets, as a correction region, a region including a position of the unit region 1501 and a portion therearound, searches the reference image for the correction region, and finds the unit region 1511. The correction region setting unit 204 then sets, as the correction region, a region including a region where the unit region 1511 is located and a region therearound, and searches the target image for unit regions within the correction region. Consequently, it can be determined that the unit region 1502 may also be deleted together.

Two integration methods used in the coupling process of coupling the unit regions 1501 and 1502 together by using the unit region 1511 in the reference image will be described with reference to FIGS. 15B and 15C. A process of coupling the point A1 in the unit region 1501 to the point A2 in the unit region 1502 in the target image 1500 will be described herein.

FIG. 15B is a diagram for describing a method for using the unit region 1511 in the reference image, which is located within a lacking region in the target image. As illustrated on the left side in FIG. 15B, the correction unit 205 superimposes, on the target image 1500, a line segment 1521 coupling the points B2, B3, and B4 and located on the inner side than end points of the unit regions in the reference image, in order to couple the points A1 and A2. Subsequently, the correction unit 205 couples the end points of the unit region 1501, the line segment 1521, and the unit region 1502 in the target image to create one coupled region. In this case, a coupled region 1522 as illustrated on the right side in FIG. 15B is obtained by connecting the points A1 and B2 and the points A2 and B4.

FIG. 15C is a diagram for describing a method for searching the reference image for a point closest to the end point of a portion at which the unit region is fragmented in the target image. Specifically, the correction unit 205 searches for a point closest to the point A1 and a point closest to the point A2 from among the points of the unit region 1511 in the reference image. In this example, the point B1 is the closest to the point A1, and the point B5 is the closest to the point A2. Thus, as illustrated on the left side in FIG. 15C, the correction unit 205 superimposes, on the target image 1500, a line segment 1531 coupling the points B1, B2, B3, B4, and B5 so that these points of the unit regions in the reference image serve as the end points. The correction unit 205 further connects the points A1 and B1 and connects the points A2 and B5. Consequently, a coupled region 1532 as illustrated on the right side in FIG. 15C is obtained. The detection data is successfully corrected using the methods described above even when polyline data is used. The target image and the reference image can be integrated together using the similar method also when thin-line images are used.

In the methods described above, the reference image is an image obtained by applying a binarization process on detection data; however, detection data can be used as the reference image without performing a process based on a threshold. Alternatively, representative positions of detection data (probability map or edge image) can be used as the reference image. For example, a binary image having information on local peak values of detection data may be used as the reference image. When this method is used, positions that are more likely to be the detection target can be coupled in a good shape.

Note that the configuration may be made so that the user can change the first threshold or the second threshold. The display unit 105 displays a threshold changing tool such as a bar or button for changing the second threshold, so that the threshold is changed in response to a user operation on the threshold changing tool. The image setting unit 202 sets again, as the reference image, an image obtained by applying a threshold-based process on the detection data by using the threshold set by the user. Then, the correction process is performed again. The display unit 105 displays the correction result of the target image. When the configuration is made so that the user can change the threshold, correction according to the preference of the user can be made.

Second Embodiment

An image processing apparatus 100 according to a second embodiment is capable of automatically setting a correction region and performing a correction process without requiring any user operation. The image processing apparatus 100 according to the second embodiment will be described below in terms of differences from the image processing apparatus 100 according to the first embodiment. The image processing apparatus 100 according to the present embodiment automatically performs the correction process on the basis of a reference image and a target image in accordance with conditions set in advance. There are three conditions that are set in advance. The first one is a condition for setting a unit region serving as a criterion region used for searching the reference image for a detected region and is referred to as a criterion region condition. The second one is a condition for setting a correction region in accordance with the unit region and is referred to as a correction region condition. The third one is a condition for adopting correction on the correction region and is referred to as an adoption condition.

In the present embodiment, the criterion region condition is set such that a region including fragmented unit regions in the target image is set as the criterion region. Here, it can be determined whether or not the unit regions are fragmented based on a condition that a distance between the unit regions in the target image is shorter than a predetermined length. Further, the correction region condition is set such that a unit region in the reference image corresponding to the criterion region and a unit region that forms a continuous region together with this unit region are set as the correction region. Note that a direction of the search may be determined in advance. In addition, the criterion region condition may be a condition that a region located within a predetermined range from each unit region in the target image is set as the criterion region.

The adoption condition is preferably set in accordance with the type of a process and properties or the like of elements that are likely to be falsely detected as the detection target. An example of automatically deleting a falsely detected region of trace of formwork in detecting cracking from an image of the wall of infrastructure will be described including a specific example of the adoption condition. Suppose that it is known in advance that trace of formwork is falsely detected together with cracking which is the detection target, for example. Further, it is known that the trace of formwork extends horizontally and vertically and is longer and exists in a wider range than the cracking. In these cases, the adoption condition for adopting the correction region as a falsely detected region of the trace of formwork and as the target of the deletion correction is as follows.

The length of the correction region is greater than a predetermined length.

The direction of a vector of a unit region of the correction region is within a predetermined angle section.

Figure 16:
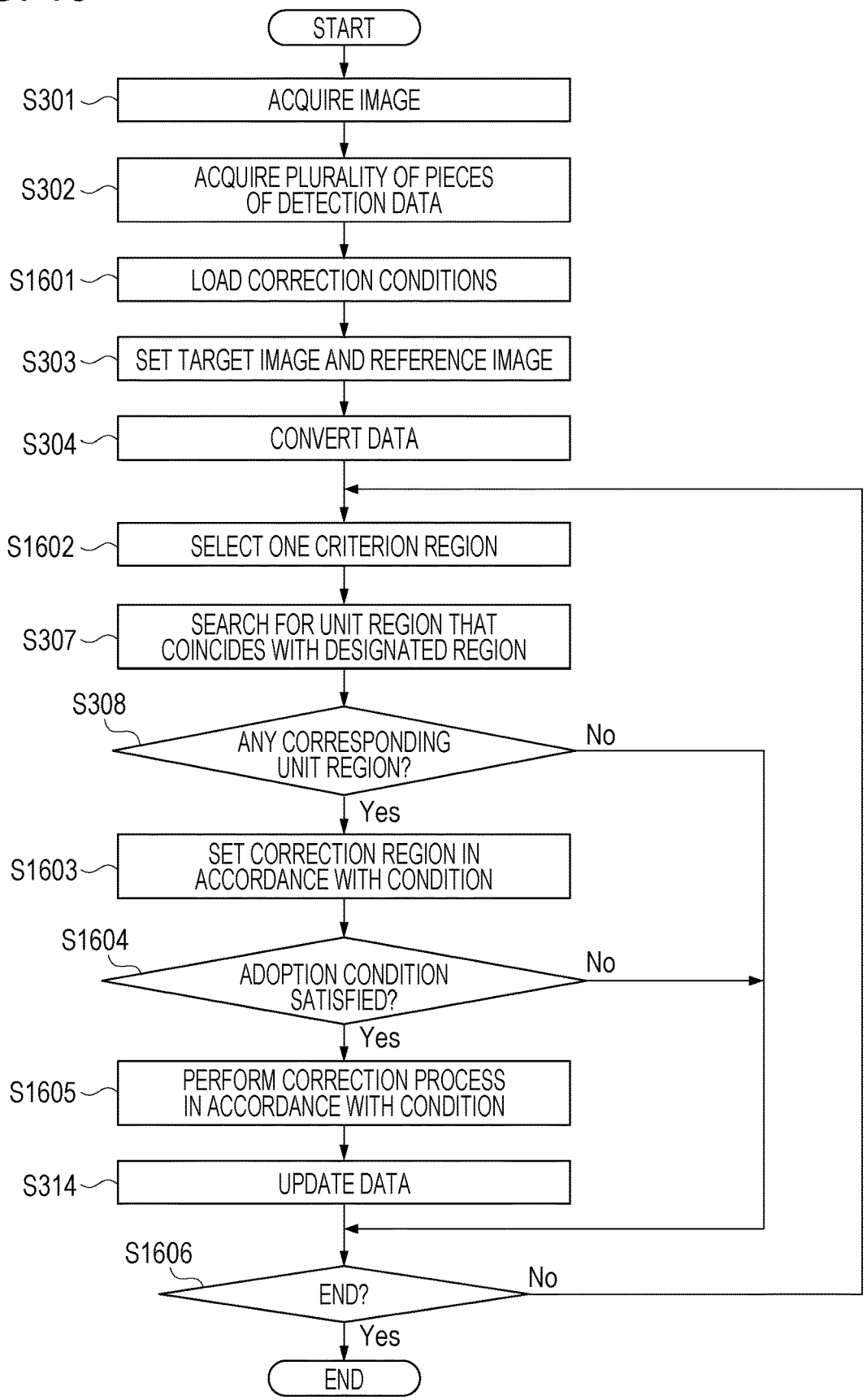
FIG. 16 is a flowchart illustrating a detection result correction process according to a second embodiment.

FIG. 16 is a flowchart of a detection result correction process performed by the image processing apparatus 100 according to the second embodiment. Each processing illustrated in FIG. 16 that is the same as the processing described with reference to FIG. 3 is assigned the same numeral. After the CPU 101 of the image processing apparatus 100 performs the processing in S302, the process proceeds to S1601. In S1601, the CPU 101 loads the conditions. Here, the conditions are the three conditions, that is, the criterion region condition, the correction region condition, and the adoption condition. The CPU 101 then causes the process to proceed to S303. Note that the processing in S1601 is only required to be performed prior to processing in S1602 described later, and the processing order is not limited to the embodiment.

After performing the processing in S304, the CPU 101 further causes the process to proceed to S1602. In S1602, the correction region setting unit 204 selects, as the criterion region, one of unit regions in the target image in accordance with the criterion region condition. Subsequently in S307, the correction region setting unit 204 searches the reference image for a unit region corresponding to the criterion region. If the correction region setting unit 204 detects the unit region corresponding to the criterion region in the reference image in S308 (Yes in S308), the process proceeds to S1603. If the correction region setting unit 204 does not detect the unit region corresponding to the criterion region in the reference image (No in S308), the process proceeds to S1606.

In S1603, the correction region setting unit 204 sets the correction region in accordance with the criterion region and the correction region condition. This process is an example of a correction region setting process. Specifically, the correction region setting unit 204 detects, in the reference image, a unit region that partly coincides with a region corresponding to the criterion region. The correction region setting unit 204 then searches for a unit region that forms a continuous region together with the detected unit region to set a region corresponding to this continuous region as the correction region. The correction region setting unit 204 further sets, as a correction region, a region in the target image corresponding to the correction region in the reference image. At that time, the correction region setting unit 204 searches the reference image for a unit region that is coupled to the retrieved unit region in a direction according to a rule determined in advance.

Then in S1604, the correction unit 205 determines whether or not to adopt the correction region, that is, whether or not to perform the designated correction process on the correction region, in accordance with the adoption condition. If the correction unit 205 determines to adopt the correction region (Yes in S1604), the process proceeds to S1605. If the correction unit 205 determines not to adopt the correction region (No in S1604), the process proceeds to S1606.

In S1605, the correction unit 205 performs the correction process according to the condition on the correction region. The process then proceeds to S314. After updating the data in S314, the CPU 101 causes the process to proceed to S1606. In S1606, the CPU 101 determines whether or not to end the process. If a unit region that is selectable as the criterion region is left in the target image, the CPU 101 determines not to end the correction (No in S1606). The process then proceeds to S1602. If the process is completed for all the unit regions selectable as the criterion region in the target image, the CPU 101 determines to end the process (Yes in S1606) and ends the detection result correction process. Note that the configuration and processes of the image processing apparatus 100 according to the second embodiment other than the above are substantially the same as the configuration and processes of the image processing apparatus 100 according to the first embodiment.

As described above, the image processing apparatus 100 is capable of automatically correcting a detected region in the second embodiment.

In a first modification of the second embodiment, the conditions set in advance may exclude the criterion region condition and may be two conditions of the correction region condition and the adoption condition. In this case, for example, a condition that there are a plurality of unit regions at positions in the target image that correspond to positions of the respective unit regions in the reference image may be set as the correction region condition. The correction region condition is an example of a preset condition relating to a detected region in a target image and a detected region in a reference image. Note that the correction region condition is only required to be determined on the basis of a positional relationship between a detected region included in the target region and a detected region included in a reference image, and a specific relationship is not limited to this example.

In a second modification, the image processing apparatus 100 may perform an integrated process of the process according to the first embodiment and the process according to the second embodiment. The image processing apparatus 100 first automatically corrects a detected region by performing the process described in the second embodiment and presents the corrected detected region to the user. Then, when accepting a correction instruction from the user, the image processing apparatus 100 collectively corrects the detected region by performing the process described in the first embodiment. In this way, the correction process can be performed more efficiently.

Third Embodiment

An image processing apparatus 100 according to a third embodiment uses, as a target image and a reference image, pieces of time-series data of the same image-captured range. In inspection of infrastructure, images of the wall of the same structure are captured regularly at intervals of several years to record a defect. Through this inspection, it can be determined whether the defect on the structure has increased compared with the state several years ago. Although images could be captured without any problem in the past, high-quality images are not obtained in some cases due to conditions such as the weather when images are captured again. As a result, automatic detection on the latest data may fail at a portion where automatic detection was successful last time. In addition, cracking that could be recorded by performing manual tracing on the past data cannot be automatically detected from the latest data in some cases. In view of such circumstances, an image of the wall of a structure for which an image was captured several years ago is captured again to detect a defect in the same region in the third embodiment. A result obtained by performing manual tracing entirely and an automatic detection result or a result obtained by manually correcting a part of the automatic detection result may be used as the past data.

Figure 17A:
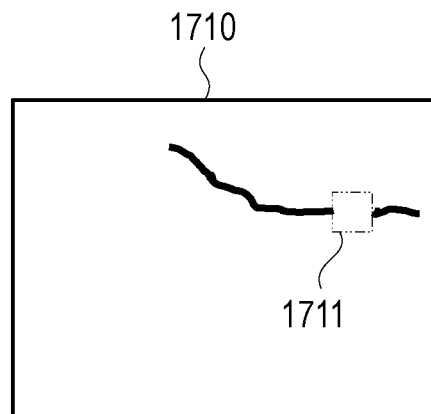
FIG. 17A is a diagram illustrating an example of a target image according to a third embodiment.
Figure 17B:
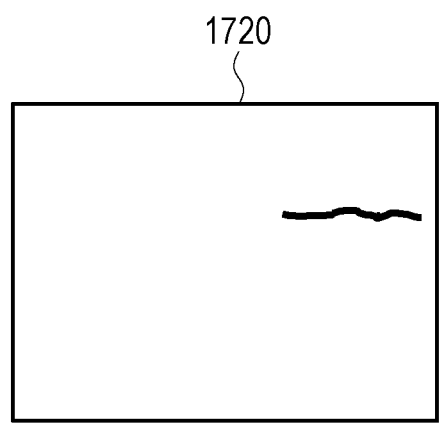
FIG. 17B is a diagram illustrating an example of a reference image according to the third embodiment.

1710 and 1720 in FIGS. 17A and 17B, respectively, denote pieces of detection data obtained from images of the same image-capturing range captured at different timings. Specifically, the detection data 1720 is detection data obtained from a captured image obtained at a past timing compared with that of the detection data 1710. The latest detection data 1710 includes a lacking region 1711 where a detected region that is present in the past detection data 1720 is lacking. The defect on the wall of a structure extends over time but does not disappear naturally. Thus, the image processing apparatus 100 sets the latest detection data 1710 as the target image and sets the past detection data 1720 as the reference image. In this way, the image processing apparatus 100 is capable of making correction by integrating the reference image into the lacking region 1711 in the target image. Note that the configuration and processes of the image processing apparatus 100 according to the third embodiment other than the above are substantially the same as the configuration and processes of the image processing apparatus 100 according to the other embodiments.

Fourth Embodiment

Figure 18A:
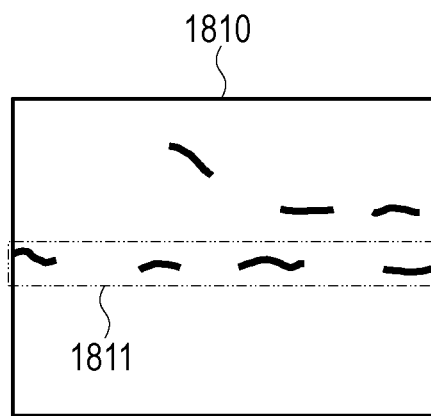
FIG. 18A is a diagram illustrating an example of a target image according to a fourth embodiment.
Figure 18B:
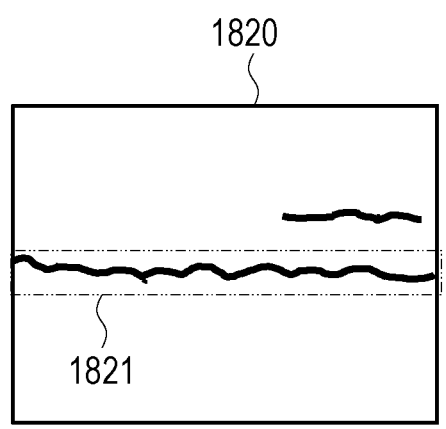
FIG. 18B is a diagram illustrating an example of a reference image according to the fourth embodiment.

An image processing apparatus 100 according to a fourth embodiment sets pieces of detection data of different detection targets as a target image and a reference image. Two methods will be described below. The first one is a method for separately performing processes of detecting different detection targets on the same captured image and setting, as the target image and the reference image, pieces of detection data obtained as a result of the processes. For example, the image processing apparatus 100 preforms a process of detecting cracking and a process of detecting trace of formwork on a certain image. Consequently, for example, detection data 1810 of cracking illustrated in FIG. 18A and detection data 1820 of the trace of formwork illustrated in FIG. 18B are obtained. Suppose that trace of formwork is actually present in a region 1811 of the detection data 1810 of the cracking. That is, detected regions in the region 1811 of the detection data 1810 of the cracking are falsely detected. In this case, the image processing apparatus 100 sets the detection data 1810 of the cracking as the target image and sets the detection data 1820 of the trace of formwork as the reference image, thereby being capable of deleting the falsely detected regions of the detection data of the cracking by using the detection data of the trace of formwork. Here, the detection data of the cracking is an example of an image including a detected region in which it is determined that a detection target is detected, and the detection data of the trace of formwork is an example of an image including a detected region in which it is determined that a non-detection target is detected.

Now, a process of obtaining the detection data of the cracking and the detection data of the trace of formwork will be described. In machine learning, original images of the detection target are prepared. Images in which a correct answer label is attached to a position where the detection target is located are prepared as correct answer data. Training is performed using a vast number of sets of the original image and the correct answer data. Consequently, a model for detecting the detection target can be generated. Models for detecting cracking and trace of formwork that set cracking and trace of formwork as the detection target, respectively, are separately prepared using this method, so that detection results can be obtained by the respective models as the detection data of the cracking and the detection data of the trace of formwork. The image processing apparatus 100 or another apparatus separately generates a cracking detection model that is trained using sets of an original image of cracking and correct answer data of the cracking and a trace-of-formwork detection model that is trained using sets of an original image of trace of formwork and correct answer data of the trace of formwork. Then, the generated models are set in the image processing apparatus 100. The image processing apparatus 100 separately applies the cracking detection model and the trace-of-formwork detection model to a captured image to obtain the detection data of the cracking and the detection data of the trace of formwork.

The second one is a method for using results obtained by detecting a certain detection target using a plurality of means. For example, the image processing apparatus 100 sets, as the target image and the reference image, detection data of cracking obtained by an outline extraction process and detection data of cracking obtained by an edge detection process, respectively. Note that the combination of the target image and the reference image is not limited to this combination. The image processing apparatus 100 may set images representing the probability of being the detection target obtained using different techniques, as the target image and the reference image. Note that the configuration and processes of the image processing apparatus 100 according to the fourth embodiment other than the above are substantially the same as the configuration and processes of the image processing apparatus 100 according to the other embodiments.

In the embodiments above, the description has been given, using an image of infrastructure, of the case where data of a defect such as cracking on the wall of a structure is set as the detection target. However, the detection target is not limited to a defect. For example, the embodiments may be applied to correction of a trajectory resulting from outline extraction of an object or tracking of a person, for example. In the case of outline extraction, the detection result can be corrected using results obtained when a plurality of thresholds are set as in detection of the defect data. In the case of tracking, the embodiments are applicable to the case where there are results of processes based on a plurality of thresholds or results of tracking a moving object using a plurality of means.

The present invention may be implemented as a process that runs as a result of supplying a program implementing one or more functions of the embodiments described above to a system or apparatus via a network or storage medium and one or more processors of a computer of the system or apparatus reading and executing the program. In addition, the present invention may also be implemented by circuitry (ASIC, for example) that implements the one or more functions.

According to the present invention, a false positive and a false negative can be corrected efficiently and appropriately in image-based inspection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
one or more processors configured to cause the image processing apparatus to:
detect a first detected region from an input image on the basis of a first detection criterion and a second detected region from the input image on the basis of a second detection criterion, wherein the first detection criterion is based on a first threshold and the second detection criterion is based on a second threshold that is smaller in value than the first threshold;
set, as a target image subjected to correction, an image including the first detected region, and set, as a reference image that is referred to in a correction process, an image including the second detected region;
set a unit region in the detected region in each of the target image and the reference image by segmenting the detected region in each of the target image and the reference image, the unit region serving as a unit of processing in the correction process;
set a to-be-corrected region in the reference image; and
correct the unit region in the target image on the basis of the to-be-corrected region set in the reference image.

2. The image processing apparatus according to claim 1, wherein the one or more processors are further configured to cause the image processing apparatus to set, as the unit region, a continuous region in which it is determined that a detection target is detected.

3. The image processing apparatus according to claim 2, wherein the one or more processors are further configured to cause the image processing apparatus to set the unit region on the basis of a branch point in the continuous region in which it is determined that the detection target is detected.

4. The image processing apparatus according to claim 1, wherein the one or more processors are further configured to cause the image processing apparatus to
set, in accordance with a second condition that is predetermined, a plurality of the unit regions included in the reference image as a continuous region, and
set the to-be-corrected region on the basis of the continuous region.

5. The image processing apparatus according to claim 2, wherein the one or more processors are further configured to cause the image processing apparatus to set, as a correction region, a plurality of unit regions in the target image that correspond to the continuous region.

6. An image processing method comprising:
detecting a first detected region from an input image on the basis of a first detection criterion and a second detected region from the input image on the basis of a second detection criterion, wherein the first detection criterion is based on a first threshold and the second detection criterion is based on a second threshold that is smaller in value than the first threshold;
setting, as a target image subjected to correction, an image including the first detected region, and setting, as a reference image that is referred to in a correction process, an image including the second detected region;
setting a unit region in the detected region in each of the target image and the reference image by segmenting the detected region in each of the target image and the reference image, the unit region serving as a unit of processing in the correction process;
setting a to-be-corrected region in the reference image; and
correcting the unit region in the target image on the basis of the to-be-corrected region set in the reference image.

7. A non-transitory computer readable storage medium storing a program that, when executed by one or more processors, causes a computer to:
detect a first detected region from an input image on the basis of a first detection criterion and a second detected region from the input image on the basis of a second detection criterion, wherein the first detection criterion is based on a first threshold and the second detection criterion is based on a second threshold that is smaller in value than the first threshold;
set, as a target image subjected to correction, an image including the first detected region, and set, as a reference image that is referred to in a correction process, an image including the second detected region;
set a unit region in the detected region in each of the target image and the reference image by segmenting the detected region in each of the target image and the reference image, the unit region serving as a unit of processing in the correction process;
set a to-be-corrected region in the reference image; and
correct the unit region in the target image on the basis of the to-be-corrected region set in the reference image.

8. The image processing apparatus according to claim 1, wherein the one or more processors are further configured to cause the image processing apparatus to:
accept, from a user, designation of a region in the target image and a correction instruction for the designated region.

9. The image processing apparatus according to claim 8, wherein the one or more processors are further configured to cause the image processing apparatus to set, in the reference image, the to-be-corrected region on the basis of the designated region.

10. The image processing apparatus according to claim 9, further comprising:
a display for displaying, as a correction-target region, a region corresponding to the to-be-corrected region in the target image,
wherein the one or more processors are further configured to cause the image processing apparatus to correct the correction-target region in response to accepting, from a user, confirmation of the correction-target region displayed by the display.

11. The image processing apparatus according to claim 9, wherein, as the correction process, the one or more processors are further configured to cause the image processing apparatus to couple a plurality of detected regions included in the correction region to correct the plurality of detected regions into a continuous detected region.

12. The image processing apparatus according to claim 9, wherein, as the correction process, the one or more processors are further configured to cause the image processing apparatus to delete a detected region included in the correction region.

13. The image processing apparatus according to claim 9, wherein the one or more processors are further configured to cause the image processing apparatus to:
- further accept a correction instruction for the correction region in response to a user operation; and
- modify the correction region in accordance with the correction instruction.

* * * * *